Aug. 10, 1954
F. B. LENZ
2,685,935
ACOUSTIC DIAPHRAGM
Filed May 20, 1949
3 Sheets-Sheet 1
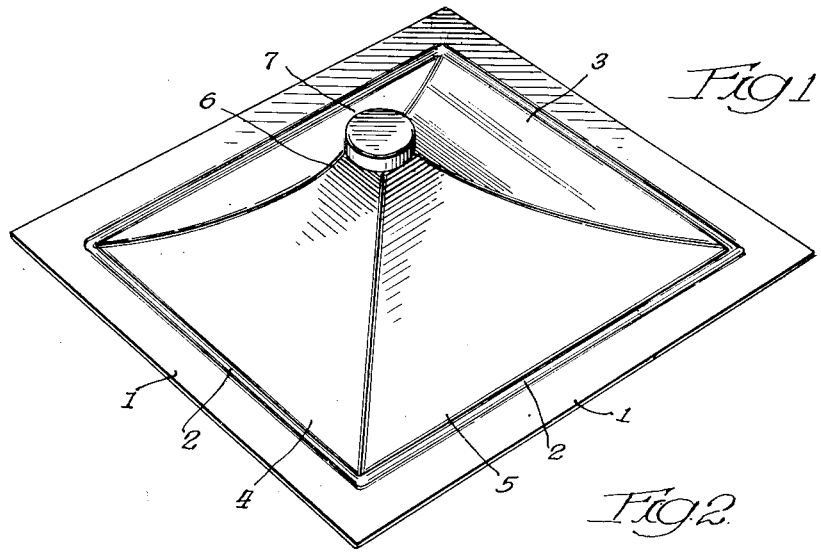
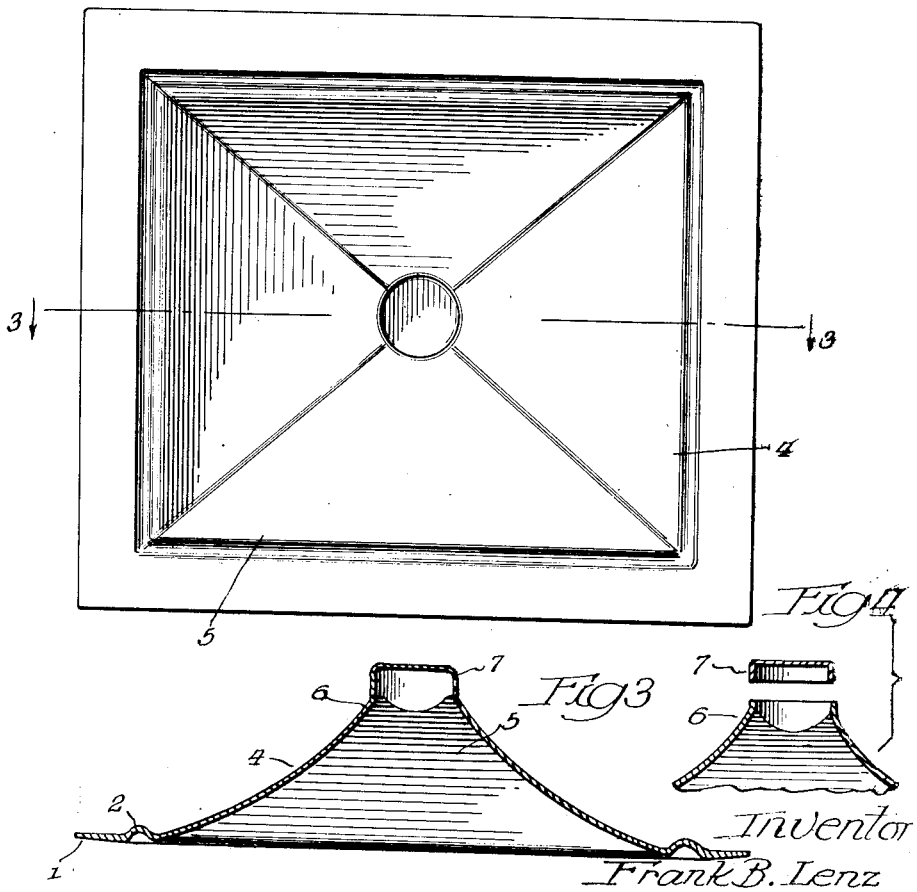
Inventor
Frank B. Lenz
By: Spencer, Mergall, Johnston & Cook
Attys Aug. 10, 1954

F. B. LENZ 2,685,935

ACOUSTIC DIAPHRAGM

Filed May 20, 1949

Inventor
Frank B. Lenz
By Spencer, Marzall,
Johnston & Cook
attys

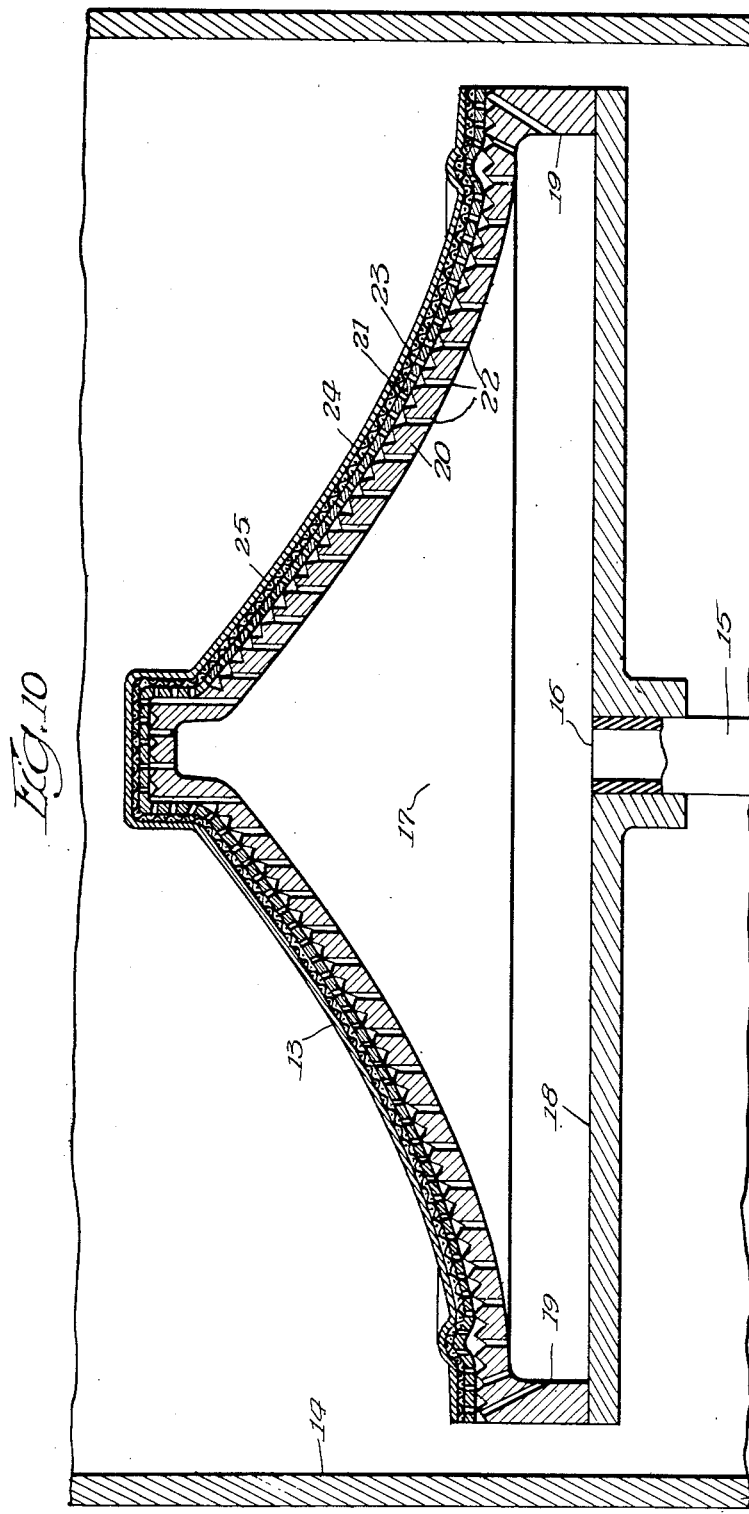

Patented Aug. 10, 1954

2,685,935

UNITED STATES PATENT OFFICE 2,685,935

ACOUSTIC DIAPHRAGM

Frank B. Lenz, St. Charles, Ill., assignor to Hawley Products Company, St. Charles, Ill., a corporation of Delaware Application May 20, 1949, Serial No. 94,471

4 Claims. (Cl. 181—32)

This invention relates in general to acoustical devices and more particularly to improved types of sound reproducing diaphragms.

An object of this invention is to provide a sound producer or reproducer which will have a substantially even response curve, where all sounds of the audible range will be produced or reproduced with substantially equal efficiency.

Another object of this invention is to provide a diaphragm capable of reproducing both high and low frequency notes corresponding in intensity, timbre mellowness, and other qualities with the originally produced sound waves.

A further object of the invention is to provide a sound reproducing diaphragm in a substantially rectangular shape.

A still further object of the invention is to provide a rectangular sound reproducing diaphragm which is thin and light in weight.

These and other objects will become more apparent from the following description of the drawings illustrating the invention in which:

Fig. 1 is a perspective view of one form of diaphragm contemplated by the invention;

Fig. 2 is a front plan view of the diaphragm shown in Fig. 1;

Fig. 3 is a sectional view along the line 3—3 of the diaphragm shown in Fig. 2;

Fig. 4 is a detailed sectional view of a portion of the diaphragm shown in Fig. 3;

Fig. 10 is a sectional view of a mold employed in the formation of the diaphragm shown in Figs. 5 and 6.

Figure 5:
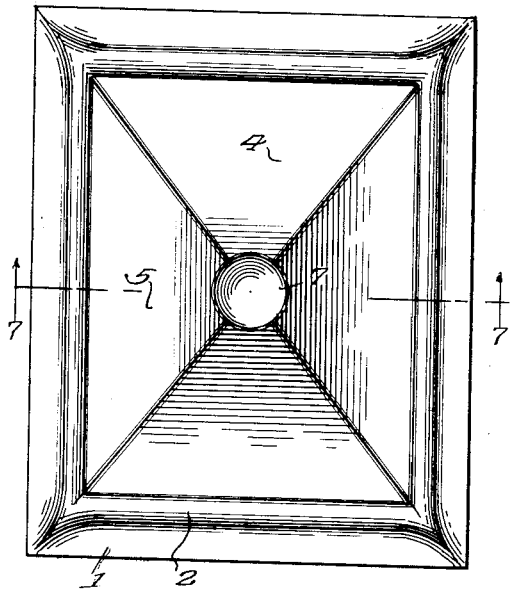
Fig. 5 is a rear plan view of a modification of the diaphragm shown generally in Fig. 1.

Referring now in more detail to the drawings, the diaphragm shown in Fig. 1 consists of a supporting flange member or border 1 around the base of the diaphragm and adapted to be clamped between supporting braces or the like of a speaker. Integrally connected to the flange in one continuous molded piece is an undulated portion 2 constituting a flexible, pliable, or supple juncture between the supporting flange 1 and the vibratile 3. The vibratile 3 consists of the concavely curved sections 4 and 5 which converge from the base flange 1 to the apex of the pyramid 6. The nipple or tubular apical portion 7 is integrally attached to the concavely curved vibratile sections which make up the sides of the pyramid. The nipple or tubular apical portion 7 is designed for the attachment thereto of a band carrying a voice coil adapted to operate in the conventional manner in a dynamic loudspeaker.

As will be seen quite clearly from the front plan view, Fig. 2, and the sectional side view, Fig. 3, the concavely curved portions 4 and 5 differ in size and shape. Part 4 is narrower in width at the base than is part 5, and part 4 rises to the apex of the pyramid in a more gentle slope than does part 5. In addition, the radius of the curved portion 4 differs from the radius of the curved portion 5. All of these factors play an important part in the improved performance of the diaphragm.

Figure 6:
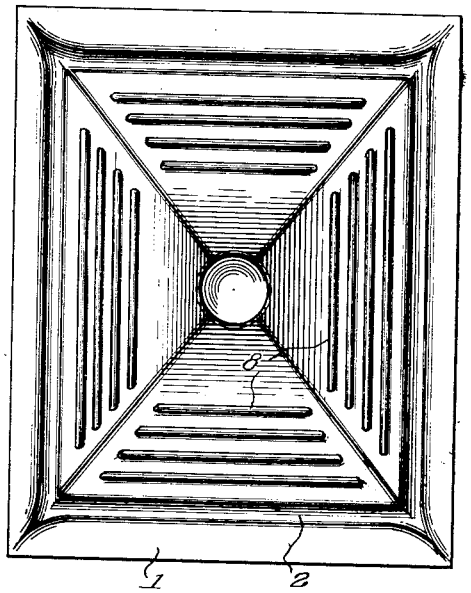
Fig. 6 is a front plan view of the modification shown in Fig. 5.
Figure 7:
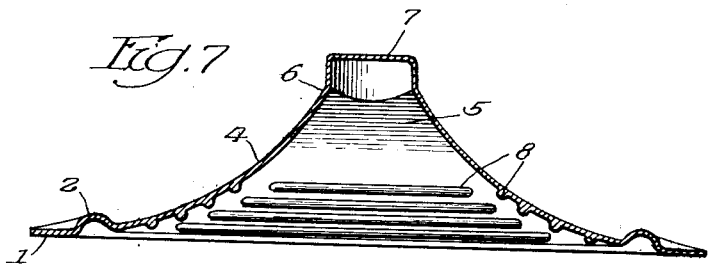
Fig. 7 is a sectional view of the modification shown in Figs. 5 and 6.

The Figs. 5, 6 and 7 represent three views of a preferred modification of the invention illustrated generally in Fig. 1. The rear plan view, Fig. 5, shows a substantially smooth back surface on the diaphragm. Fig. 6 is a front plan view of the same diaphragm in which a series of raised solid ridges 8 are molded into each of the concavely curved portions 4 and 5 forming the sides of the pyramid. In Fig. 7 the ridges 8 are shown in more detail in respect to their position in the concavely curved portion 5.

Figure 8:
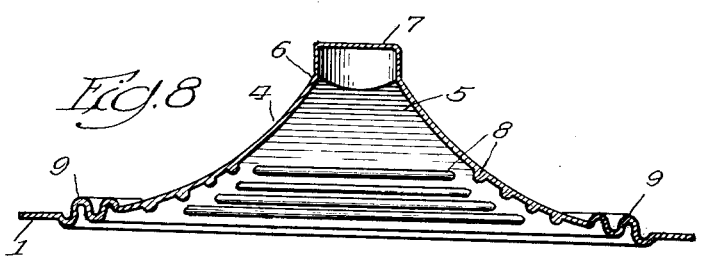
Fig. 8 is a sectional view of another modification showing a plurality of corrugations.

Figure 8 illustrates an alternative embodiment of the diaphragm shown generally in Figs. 5, 6 and 7. In Fig. 8 the undulated portion 9 consists of a plurality of corrugations or waves between the flange 1 and the body or vibratile portion.

Figure 9:
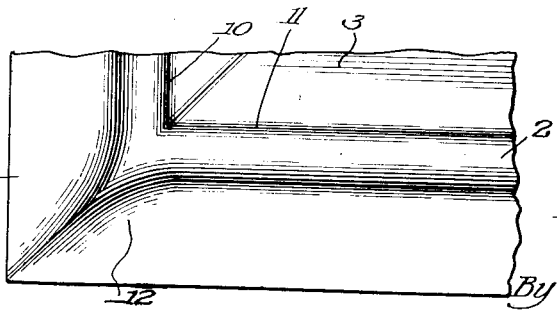
Fig. 9 is an enlarged plan view of one modification of the corner construction showing the smooth juncture between corrugations.

Fig. 9 is an enlarged view of a corner construction employed in making rectangular diaphragms. The flange 1 is connected to the body 3 by means of the undulated portion 2. The undulated portion consists of two corrugations 10 and 11 which converge to form the juncture 12. It is desirable that these corrugations be flexibly joined at the corner of the diaphragm in order to overcome any tendency for stiffness at this point which would affect the vibration of the diaphragm. Hence, a gradually fading junction is effected between the converging corrugations as shown at 12 in Fig. 9. A corner thus prepared will be flexible and strong enough to prevent breaking out due to vibration.

In Fig. 10 one method and apparatus for making the diaphragm is shown. The former 13 is immersed in a slurry of fibrous material contained in the bath 14. Suction is applied through the conduit 15 and the opening 16 to the hollow inner body 17. The hollow body is formed by the base 18, the side portion 19 and the perforated top 20. The mold part of the former 13 comprises the top 20 the upper side of which 21 is provided with a number of openings 22 communicating with the outer surface. These openings function to drain away the water when a fibrous material is deposited from a slurry. A thin sheet or screen 23 having a large number of small openings covers the upper body surface 21 and is contoured to conform to the final shape of the diaphragm. A fine mesh screen or sheet 24 may be placed over the sheet 23, this screen also being contoured to conform with the sheet 23. The fine screen 24 may or may not be used, but it has been found that it facilitates the removal of the diaphragm after molding.

In operation the former described above is immersed in the bath 14 containing fibers in a slurry and suction is applied to the former 13. The fibers will be caused to accrete upon the contoured screen 24 until a suitable layer 25 has been deposited. Then the former is removed from the bath, and air is drawn through the accreted fiber layer to reduce the moisture content. The partially dried blank may be pressed for shaping or it may be dried according to any of the known methods.

The corrugated or undulated portion shown generally at 2 in the figures and specifically at 9 in Fig. 8, plays an important part in the utility of the diaphragm. The undulated portion may consist of a single corrugation or a plurality of corrugations as in Fig. 8. A plurality of corrugations allows for greater freedom of movement of the vibratile portion.

As previously indicated, one of the difficulties with rectangular diaphragms is that there is more than one panel and each panel of the rectangular diaphragm has a tendency to vibrate at a frequency which is different from the frequency of vibration of other panels. The sound waves produced in such a diaphragm are continually reflected from one surface to another until they finally pass beyond the confines of the diaphragm. Since each panel has its own resonance characteristics, which are further modified by the reflections from other panels, a choppy resonance curve is produced. The result is a distortion or unnaturalness of the propagated sound waves, and the quality of the reproduced sound is very poor.

In accordance with this invention such distortion or unnaturalness may be substantially overcome by the employment of the features described herein. A principal feature of the invention is the use of the curved surfaces for the panels of the rectangular diaphragm. If the vibratile portion is concavely curved, the tendency for each individual panel to vibrate in its own resonance frequency is minimized. Therefore, the resonance curve produced by a diaphragm employing concavely curved sections is essentially smooth. With such a diaphragm the faithfulness of the sound reproduction is enhanced or increased to an extent previously available only in conical diaphragms.

In order to provide a very thin molded diaphragm which at the same time will have the desired structural strength, the ridges 8, as shown in Figs. 6 and 7, have been employed herein to impart increased rigidity. These ridges are preferably placed near the base of the diaphragm rather than near the apex. When so located they enhance the strength of the thin diaphragm without interfering with the faithfulness of sound reproduction therefrom.

An acoustic diaphragm having a substantially rectangular shape has a number of advantages. By the practice of this invention, a diaphragm having good structural strength may be constructed in a rectangular shape thereby adding to the strength of the thin lightweight diaphragm. A further advantage of a rectangular pyramidal diaphragm lies in its particularly desirable shape since it may be employed in numerous situations where a conical diaphragm would not be satisfactory. For instance, it is particularly advantageous to use a speaker of rectangular shape in the area underneath the dash of an automobile.

From the foregoing description and drawings, it is apparent that the practice of my invention now makes possible the production of an acoustic diaphragm which combines all the advantages of a rectangular form with the excellent sound reproducing qualities which have heretofore been possible only in conical diaphragms.

The invention is hereby claimed as follows:

1. A rectangular pyramidal single-piece integrally formed dynamic acoustic diaphragm comprising a tubular apical portion, a rectangular supporting portion, and a four-sided, inwardly curved, concave vibratile portion integrally connecting said supporting portion and said apical portion, the sides of said vibratile portion being integrally connected with each other, said supporting portion comprising an integral border extending around the outside of the lower ends of the four sides of said vibratile portion, a flexible corrugated portion integrally connecting the lower edge of each of said sides of said vibratile portion with said border portion, each of said corrugated portions fading away gradually at the points where they would normally intersect.

2. A rectangular pyramidal single-piece integrally formed dynamic acoustic diaphragm comprising a tubular apical portion, a rectangular supporting portion, and a four-sided inwardly curved, concave vibratile portion integrally connecting said supporting portion and said apical portion, the sides of said vibratile portion being integrally connected with each other, said supporting portion comprising an integral border extending around the outside of the lower ends of the four sides of said vibratile portion, a flexible corrugated portion integrally connecting the lower edge of said sides of said vibratile portion with said border portion, each of said corrugated portions fading away gradually at and beyond the points where they would normally intersect.

3. A rectangular pyramidal single-piece integrally formed dynamic acoustic diaphragm comprising a tubular apical portion, a rectangular supporting portion and a four-sided inwardly curved, concave vibratile portion integrally connecting said supporting portion and said apical portion, the sides of said vibratile portion being integrally connected with each other, said supporting portion comprising an integral border extending around the outside of the lower ends of the four sides of said vibratile portion, a flexible corrugated portion integrally connecting the lower end of each of said sides of said vibratile portion with said border portion, each of said corrugated portions fading away gradually at the points where they would normally intersect and said vibratile portion comprising an integral solid supporting ridge disposed on a surface of each of said sides substantially parallel to the lower edges of said sides and in a lower part of said vibratile portion.

4. A rectangular pyramidal single-piece integrally formed dynamic acoustic diaphragm comprising a tubular apical portion, a rectangular supporting portion and a four-sided, inwardly curved, concave vibratile portion integrally connecting said supporting portion and said apical portion the sides of said vibratile portion being integrally connected with each other and said vibratile portion comprising a plurality of integral solid supporting ridges disposed on a surface of each of said sides substantially parallel to the lower edges of said sides and located in the lower part of said sides, the upper part of said sides of said vibratile portion being substantially free from ridges, said supporting portion comprising an integral border extending around the outside of the lower edge of each of said sides of said vibratile portion, a flexible corrugated portion integrally connecting the lower end of each of said sides of said vibratile portion with said border portion, each of said corrugated portions fading away gradually at the points where they would normally intersect and all portions of said diaphragm including said solid supporting ridge being composed essentially of accreted fibers.

References Cited in the file of this patent

UNITED STATES PATENTS

| Number | Name | Date |
|---|---|---|
| 1,729,407 | Stevens | Sept. 24, 1929 |
| 1,799,942 | Wurdel et al. | Apr. 7, 1931 |
| 1,844,605 | Seabert | Feb. 9, 1932 |
| 1,846,937 | Bedford | Feb. 23, 1932 |
| 1,870,417 | Mallina | Aug. 9, 1932 |
| 1,901,631 | Carlisle | Mar. 14, 1933 |
| 1,913,645 | Stenger | June 13, 1933 |
| 1,930,328 | Tichenor | Oct. 10, 1933 |
| 1,984,019 | Hawley | Dec. 11, 1934 |
| 2,072,705 | Stenger | Nov. 12, 1935 |
| 2,071,829 | Glen | Feb. 23, 1937 |
| 2,124,834 | Stenger | July 26, 1938 |